(12) United States Patent
Khurana et al.

(10) Patent No.: US 7,359,322 B2
(45) Date of Patent: Apr. 15, 2008

(54) DYNAMIC BANDWIDTH REALLOCATION

(75) Inventors: Sumit Khurana, Parsippany, NJ (US);
Sunil Samtani, Harrison, NJ (US);
Rajesh Talpade, Madison, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 892 days.

(21) Appl. No.: 10/216,968

(22) Filed: Aug. 12, 2002

(65) Prior Publication Data

US 2004/0028054 A1 Feb. 12, 2004

(51) Int. Cl.
*H04J 3/14* (2006.01)
*H04J 3/22* (2006.01)
*H04L 12/26* (2006.01)

(52) U.S. Cl. ............ 370/230; 370/395.21; 370/395.41; 370/468

(58) Field of Classification Search ................ 370/230, 370/395.21, 395.41, 468
See application file for complete search history.

(56) References Cited

U.S. PATENT DOCUMENTS

| | | | | |
|---|---|---|---|---|
| 5,841,777 | A * | 11/1998 | Cohen | 370/443 |
| 5,917,822 | A * | 6/1999 | Lyles et al. | 370/395.4 |
| 6,163,524 | A * | 12/2000 | Magnusson et al. | 370/208 |
| 6,337,849 | B1 * | 1/2002 | Smith et al. | 370/230 |
| 6,456,630 | B1 * | 9/2002 | Packer et al. | 370/466 |
| 6,496,504 | B1 * | 12/2002 | Malik | 370/390 |
| 6,563,829 | B1 * | 5/2003 | Lyles et al. | 370/395.21 |
| 6,600,914 | B2 * | 7/2003 | Uhlik et al. | 455/404.1 |
| 6,735,633 | B1 * | 5/2004 | Welch et al. | 709/233 |
| 6,907,004 | B1 * | 6/2005 | Ramsey et al. | 370/235 |
| 6,941,380 | B2 * | 9/2005 | Cunningham | 709/235 |
| 6,956,857 | B2 * | 10/2005 | Goldman | 370/395.2 |
| 6,975,594 | B1 * | 12/2005 | Byers | 370/238 |
| 7,092,356 | B2 * | 8/2006 | Rabie et al. | 370/230 |
| 7,263,063 | B2 * | 8/2007 | Sastry et al. | 370/235 |
| 2002/0087699 | A1 * | 7/2002 | Karagiannis et al. | 709/227 |
| 2002/0089985 | A1 * | 7/2002 | Wahl et al. | 370/395.1 |
| 2003/0072264 | A1 * | 4/2003 | Mo et al. | 370/235 |
| 2003/0081548 | A1 * | 5/2003 | Langevin et al. | 370/230 |

* cited by examiner

*Primary Examiner*—Alpus H. Hsu
(74) *Attorney, Agent, or Firm*—Glen R. Farbanish; Philip J. Feig (57) ABSTRACT

Bandwidth allocated between the traffic classes of a network path is dynamically reallocated when one or more traffic classes have insufficient available bandwidth to support a service request for the traffic classes, wherein the reallocation occurs without modifying the traffic class bandwidth allocations enforced by router mechanisms. A provisioning system maintains an available bandwidth indication for each traffic class, which indications are decremented as a service request is admitted to the path. If a requested traffic class has insufficient available bandwidth to support a request, one or more other traffic classes can loan bandwidth to the requested traffic class by decrementing the available bandwidth indicators for the one or more other traffic classes in the amount of the insufficiency, thereby indicating that less bandwidth is available in these classes for future requests. The provisioning system also maintains an indication of the amount of bandwidth each traffic class loans to the other traffic classes.

19 Claims, 5 Drawing Sheets

DYNAMIC BANDWIDTH REALLOCATION

BACKGROUND OF OUR INVENTION

1. Field of the Invention

Our invention relates generally to packet networks that support multiple traffic classes. More particularly, our invention relates to dynamic bandwidth reallocation among the traffic classes of a path within a packet network wherein the dynamic reallocation occurs without having to physically reconfigure the network.

2. Description of the Background

Enterprises have traditionally used connection-oriented ATM/Frame-relay based networks for their intranet and extranet applications, such as interconnecting remote sites, because these technologies provided guaranteed quality of service. However, because of the ubiquity of IP (internet protocol) based networks and the lower costs associated with these networks, enterprises are turning to virtual private networks (VPNs) offered by Internet Service Providers (ISPs) as an alternative way to interconnect remote sites. The problem with IP based VPNs however, is that they do not inherently provide the guaranteed quality of service offered by ATM and Frame-relay.

As a result, ISPs are deploying a combination of Diffserv (Differentiated Services) and MPLS (Multi-protocol Label Switching) based technologies in their IP networks to help provide the necessary quality of service guarantees. MPLS allows for the provisioning of label switched paths (LSPs) between pairs of edge routers in the ISP's network. Advantageously, MPLS provides a finer degree of control than traditional IP routing and as a result, allows the ISP to configure the LSPs along specifically engineered network paths such that each LSP is ensured a minimum bandwidth. Once the engineered LSPs are provisioned, the ISP uses the LSPs to provide customer VPN services such that the expected aggregate VPN traffic-demand from a set of customers along any given LSP does not exceed the LSP's minimum bandwidth, thereby ensuring each customer's VPN service has a guaranteed quality of service.

Diffserv works in combination with internal network router mechanisms, such as weighted fair queuing (WFQ) and dynamic round robin (DRR), to provide traffic/service classes within a network. Traffic classes are a way to treat various types of traffic differently and, of particular interest here, provide a way to create guaranteed bandwidth classes along a network link's fixed bandwidth. Diffserv, for the purposes of this discussion, provides policing and marking functions at the edge routers of an ISP's network. ISP customers subscribe to one or more traffic classes and an expected amount of bandwidth for each traffic class. In accordance with the subscribed services, Diffserv classifies and marks each data packet entering the network according to the different classes and polices the packets to ensure a customer is not exceeding its requested bandwidth. The internal network router mechanisms process each data packet in accordance with its corresponding traffic class.

The combination of MPLS, Diffserv, and WFQ/DRR allows for the creation of LSPs with engineered bandwidth where the bandwidth of each LSP is allocated and policed among different traffic classes. As a result, ISPs now offer VPN services using LSPs that provide guaranteed quality of service and where the VPN customer traffic is segregated among different traffic classes of the LSP. Diffserv marks the customer traffic based on the contracted services and polices customer access to each LSP by ensuring the customer traffic does not exceed service contracts for any one traffic class within the LSP.

In this combined environment, an ISP estimates the expected aggregate customer VPN traffic demand between pairs of edge routers and creates an engineered LSP between each edge router pair based on these estimates. In addition, the ISP estimates the bandwidth requests customers will make for each traffic class within an LSP. Based on the aggregate view of the LSP, the ISP then configures the WFQ/DRR mechanisms of the internal routers to support the estimated bandwidth for each traffic class of the LSP.

Customers requesting new VPN service specify to the ISP the remote sites to be interconnected and a set of bandwidth requests for one or more traffic classes between the sites. After mapping the VPN service request to an LSP that can interconnect the customer sites and prior to provisioning the new VPN service request, the ISP next determines whether the traffic classes of the chosen LSP can support the corresponding bandwidth requests. Specifically, the ISP takes into consideration the bandwidth being utilized by other customer traffic currently assigned to the LSP. The ISP may do this by tracking the aggregate bandwidth requests for each VPN service request mapped to the LSP or it may monitor the network to determine an LSP's current utilization of the traffic classes. If the bandwidth utilization for each traffic class is low enough to support the new VPN service request, the ISP accepts/admits the customer request, at which point a provisioning system performs Diffserv based policing/marking configurations on the corresponding edge routers so that the new incoming traffic is properly marked and policed per the service agreement. Accordingly, the edge routers assign and mark the incoming traffic according to a traffic class. The customer traffic is then directed to the appropriate outgoing LSP where it shares resources with the other customer traffic.

If however, one or more LSP traffic classes are over utilized such that they cannot support the additional bandwidth of the newly requested VPN service without degrading overall quality of service, the VPN service request is rejected/not admitted. Importantly, the VPN service request is rejected even if one or more traffic classes in the LSP are under utilized. The reason for this is because the WFQ/DRR configurations assigning bandwidth among the LSP traffic classes are static. In other words, once assigned, the bandwidth cannot be reallocated without performing reconfiguration of the routers. Hence, one way for the ISP to admit the new VPN service request is to reconfigure the WFQ/DRR mechanisms of the internal network routers to transfer bandwidth from the lower-utilized traffic class(es) to the higher-utilized class(es) based on the traffic demand. However, frequent reconfigurations of in-service routers is not advisable due to the error-prone effort involved, provisioning delays, potential risks to network stability, etc. As a result, an ISP will often deny the new service request, leaving its network under utilized. Hence, a VPN service request may be denied if sufficient bandwidth does not exist for a traffic class, even when other classes on the same LSP are not fully utilized and have sufficient bandwidth that could be used to meet the request.

SUMMARY OF OUR INVENTION

Accordingly, it is desirable to provide methods and systems for the dynamic reallocation of network bandwidth between the traffic classes of a path in a packet network, such as the traffic classes of an LSP in an MPLS/Diffserv based network, in order to admit new customer service requests. Specifically, our invention is directed at the dynamic reallocation of network bandwidth between traffic classes when one or more of the traffic classes have insufficient bandwidth to support a new customer service request, but wherein the traffic classes have sufficient aggregate available bandwidth to support the new request. Uniquely, our inventive methods and systems perform the dynamic reallocation without having to modify the traffic class bandwidth allocations enforced by the router WFQ/DRR mechanisms (i.e., without having to reconfigure the network), thereby utilizing the available bandwidth and overcoming the network re-provisioning issues, under-utilization issues, and other disadvantages raised by prior systems.

In accordance with our invention, an over-utilized traffic class within a network path is permitted to "borrow" bandwidth from one or more under-utilized traffic classes within the same path in order to fulfill a new service request. However, rather than reconfiguring the network routers to effectuate the transferring of bandwidth between traffic classes, a provisioning system maintains a global view of the network and broadly manages the allocation of a path's bandwidth.

Specifically, a provisioning system responsible for provisioning new customer service requests for the traffic classes of a path, tracks the path's overall allocation of bandwidth between each of the traffic classes. As the provisioning system admits and provisions new service requests for a given path, the system records a decrease in the available bandwidth of each traffic class based on the bandwidth the customer requests for each class, thereby indicating that a portion of the traffic class' bandwidth has been allocated to customer traffic. As additional customer service requests for a given path are received, the provisioning system compares the requested bandwidth for each traffic class to the bandwidth available in each class. When the available bandwidth for each requested traffic class is sufficient to meet the new request, the provisioning system admits the request. However, contrary to prior systems, when the available bandwidth for one or more traffic classes is insufficient to meet the corresponding request, the provisioning system determines if the excess available bandwidth across the other traffic classes in the path is sufficient to meet the deficiencies. If there is sufficient available bandwidth across the other traffic classes, the provisioning system borrows the excess bandwidth from these classes by noting a decrease in the available bandwidth in these classes in an amount equal to the deficiencies, thereby indicating that there is now less bandwidth available in these borrowed-from classes for future customer requests. As a result, the provisioning system ensures a path's total engineered bandwidth is not exceeded.

Importantly, in accordance with our invention, the provisioning system never reconfigures the network nor does the provisioning system actually associate allocated and borrowed bandwidth with a particular customer request. For each traffic class within a path, the provisioning system tracks the total bandwidth used by customers and the total bandwidth borrowed between classes to fulfill new requests. As important, the provisioning system never reclassifies a customer's traffic when bandwidth is borrowed between traffic classes to fulfill a new request. Once the provisioning system confirms that bandwidth is available (either directly or via borrowing) to meet the current service requests, the provisioning system admits the new requests and then performs Diffserv based policing/marking configurations instructing the network routers to mark and police all traffic for the customer in accordance with the customer's original request.

In general, bandwidth remains allocated until a customer service request is de-provisioned or altered (e.g., requesting the bandwidth for one or more traffic classes be reduced). At the point of de-provisioning a service request or reducing the requested bandwidth for one or more traffic classes, the provisioning system notes an increment in the available bandwidth for a given traffic class in accordance with the bandwidth the customer is no longer utilizing for that class. If bandwidth is reallocated to a traffic class that borrowed bandwidth from another class, the provisioning system notes an increment in bandwidth to the loaning class. In general, an increment in available bandwidth indicates that future customers can use this bandwidth.

Overall, our inventive admission control method reallocates network bandwidth dynamically between traffic classes without reconfiguring the network routers and without reclassifying the customer traffic at the edge routers as the traffic enters the network. Importantly, as compared to the prior static approach, we have found that when the network routers are configured with WFQ/DRR mechanisms, our inventive methods and systems improve network utilization among all traffic classes, increase the number of new service requests admitted to a network, and do not affect the quality of service (delay and packet loss) obtained by the traffic classes.

DETAILED DESCRIPTION OF OUR INVENTION

Figure 1:
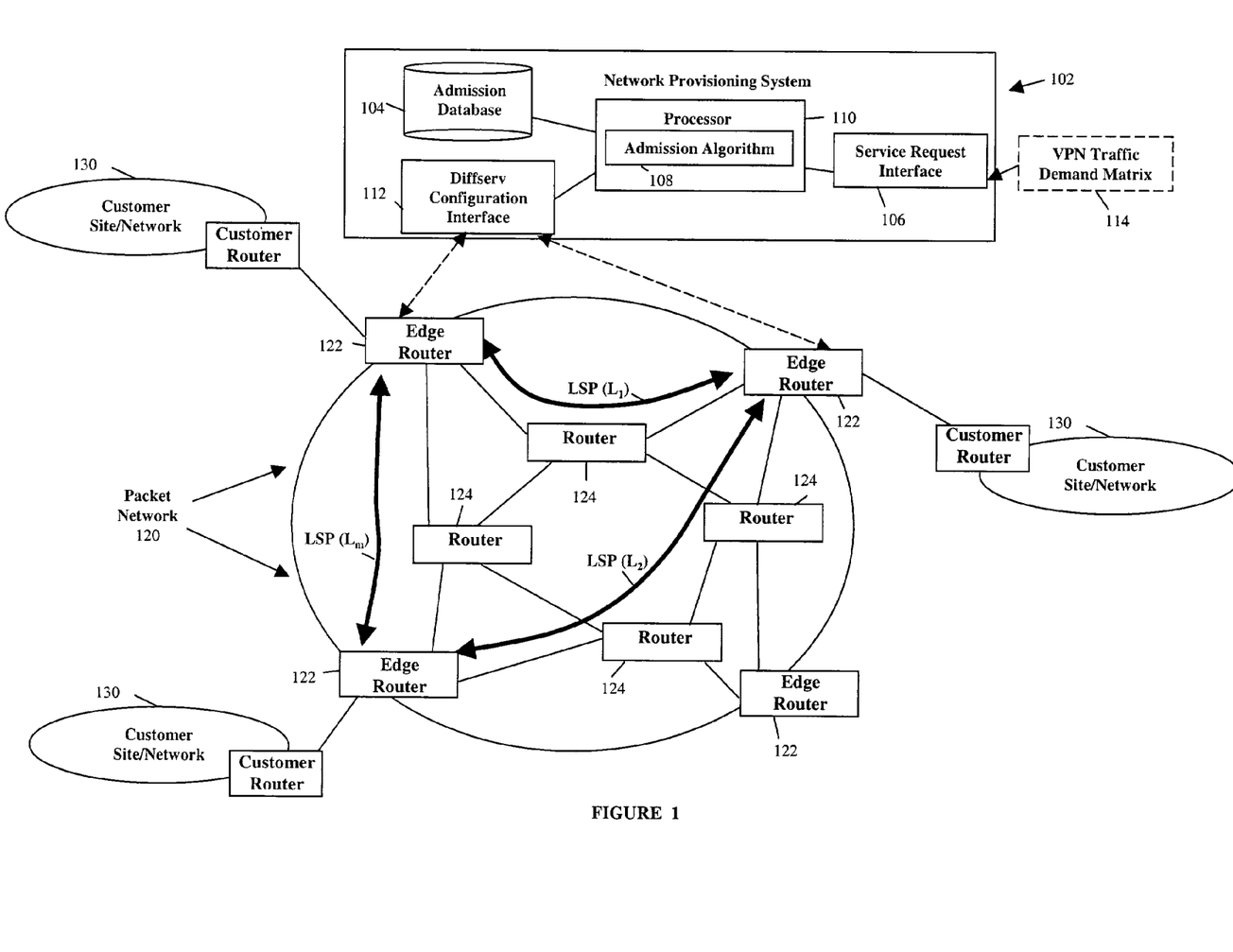
FIG. 1 depicts a diagram of an MPLS/Diffserv based network to which our inventive methods for the dynamic reallocation of bandwidth between the traffic classes of a network path is applicable, and further depicts a block diagram of a network provisioning system in accordance with our invention.

FIG. 1 is an illustrative diagram of network provisioning system 102 of our invention for dynamically reallocating network bandwidth between the traffic classes of a path within a packet network 120 in order to provision new service requests between pairs of customer sites 130. System 102 is part of a larger network configuration system, such as the Telcordia™ Network Configuration Manager. It should be noted that our invention will be described with respect to an ISP providing VPN-based services over an MPLS/Diffserv based network. However, any network comprising paths with multiple traffic classes may utilize our invention. In addition, our invention is not tied to VPN based traffic and applies to any type of customer traffic utilizing one or more traffic classes within a path.

As shown, exemplary network 120 comprises a plurality of interconnected network routers 122 and 124 configured to provide MPLS based services. Additionally, the network is configured to provide differentiated traffic classes, with routers 122 and 124 configured with WFQ/DRR mechanisms and the edge routers 122 additionally configured to perform Diffserv based policing/marking functions. For the purposes of describing our invention, it is assumed that network provisioning system 102 has priorly configured a plurality of engineered LSPs ($L_1$-$L_m$) through the network, allocated each LSP's engineered bandwidth among a set of traffic classes ($T_1$-$T_n$), and configured the WFQ/DRR router mechanisms to support these traffic classes. Note that our invention is independent of the number of traffic classes supported by each LSP and independent of whether each LSP supports the same or a different number of traffic classes. For discussions purposes, it is assumed that each LSP supports "n" traffic classes. Also, note that our invention is independent of the exact allocation of an LSP's bandwidth among the "n" traffic classes, only that network provisioning system 102 knows how an LSP's bandwidth was allocated among the "n" traffic classes. For the purposes of discussion, the allocation of bandwidth among the "n" traffic classes of each LSP will be referred to as $A_1$-$A_n$.

Network provisioning system 102 comprises an admission database 104, a service request interface 106, an admission algorithm 108, a processor 110, which executes admission algorithm 108, and a Diffserv configuration interface 112. Admission database 104 maintains a list of the LSP's ($L_1$-$L_m$) provisioned in network 120, a list of the provisioned traffic classes ($T_1$-$T_n$) for each LSP, and an available bandwidth indicator ($A_1$-$A_n$) for each traffic class within an LSP. The available bandwidth indicator ($A_1$-$A_n$) for a given traffic class shows the bandwidth available in that traffic class, as further described below. Admission database 104 additionally maintains a vector U[n] for each traffic class within an LSP. The vector U for a particular traffic class is a bandwidth loan indicator and maintains the amount of bandwidth that particular traffic class has "loaned" to the other "n-1" traffic classes in the LSP, as is further described below (e.g., for the first traffic class, $U_1[2^{nd}]$ indicates the amount of bandwidth loaned by this first traffic class to the second traffic class, etc.).

Service request interface 106 receives a customer VPN traffic demand matrix 114, which specifies pairs of customer sites (such as sites 130) a customer wishes to interconnect with VPN service using the LSPs of network 120, the total bandwidth the customer wishes to send between each site pair over an LSP, and a set of bandwidth requests $R_1$-$R_n$ for each site pair indicating how the total requested bandwidth for that site pair should be allocated among the "n" traffic classes of an LSP (again, note that VPN traffic is being used for description purposes and service request interface 106, in general, receives customer service requests).

After mapping a VPN service request entry from customer VPN traffic demand matrix 114 to a network LSP and prior to provisioning this service request, the admission control algorithm 108 analyzes the request to determine if the traffic classes ($T_1$-$T_n$) of the selected LSP have sufficient available bandwidth to support the bandwidth being requested ($R_1$-$R_n$) and thereby, whether the request should be admitted for provisioning in the network. In accordance with our invention, if all of the traffic classes ($T_1$-$T_n$) of the selected LSP can support the requested bandwidth ($R_1$-$R_n$), the admission control algorithm decrements the available bandwidth ($A_1$-$A_n$) for each traffic class by the amount of bandwidth requested, thereby indicating there is now less bandwidth available in the traffic classes for future customer requests. Conversely, if a given traffic class(es) is over-utilized and cannot support a bandwidth request, the admission control algorithm "borrows" bandwidth from one or more other under-utilized traffic classes within the same LSP in order to fulfill the request for the given traffic class. However, rather than reconfiguring the network routers to effectuate the "borrowing" of bandwidth, the admission control algorithm borrows the excess bandwidth from these under-utilized classes by noting a decrease in the available bandwidth ($A_1$-$A_n$) in these classes in an amount equal to the deficiency, and by updating the vector U[n] for each loaning traffic class, thereby indicating that these classes have loaned bandwidth. Importantly, in accordance with our invention, when bandwidth is borrowed, the network is never reconfigured nor is the customer's traffic reclassified.

Once the admission control algorithm determines the network can support a bandwidth request (either directly or via borrowing), Diffserv configuration interface 112 performs Diffserv based policing/marking configurations on edge routers 122 as part of provisioning the VPN service request. Again, note that network provisioning system 102 also comprises subsystems for configuring the network LSPs, for configuring the WFQ/DRR router mechanisms, etc. These subsystems are not particular to our invention.

Figure 2:
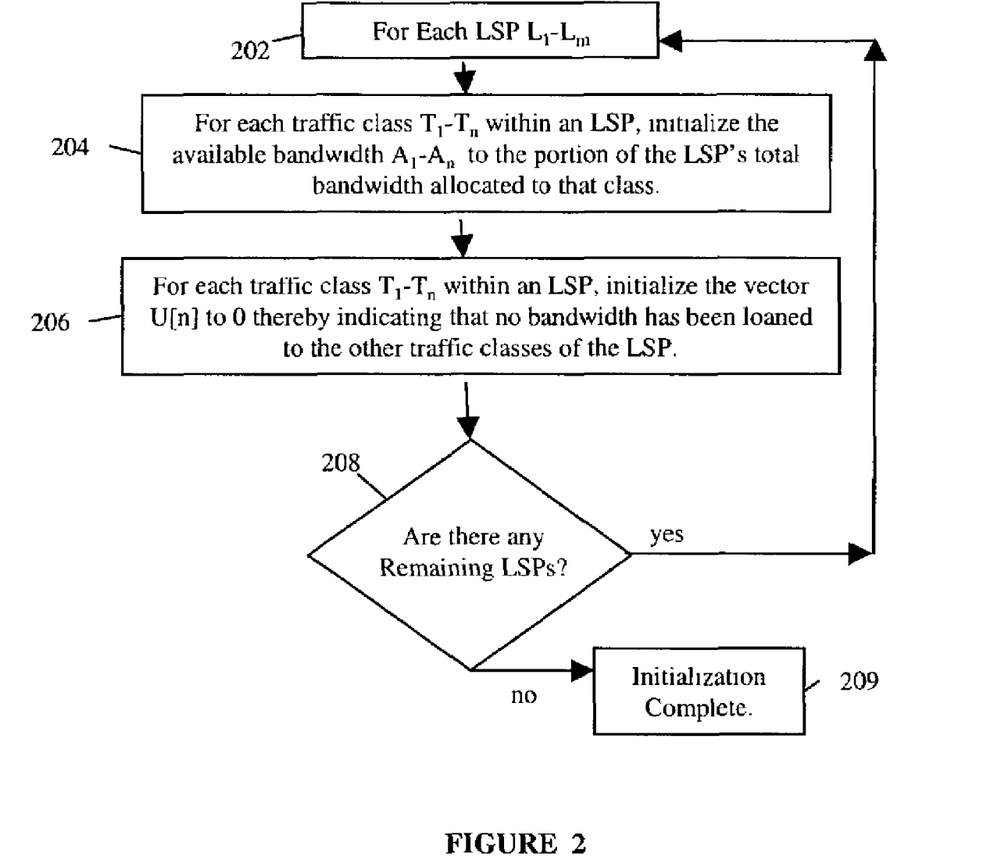
FIGS. 2, 3, and 4 depict an illustrative embodiment of our invention for the dynamic reallocation of bandwidth between the traffic classes of a network path when one or more of the traffic classes have insufficient bandwidth to support the addition of a new customer service request to the network path, wherein the reallocation occurs without modifying the traffic class bandwidth allocations enforced by the network router mechanisms.

Reference will now be made to a first embodiment of our inventive method for dynamically reallocating network bandwidth between the traffic classes of a path in order to admit a new service request, this first embodiment being shown in the flow diagrams of FIGS. 2, 3, and 4 and as performed by processor 110 through the execution of admission algorithm 108. In this first embodiment, any traffic class within an LSP can borrow bandwidth from any other traffic class within the same LSP. Beginning with FIG. 2, steps 202-208 show the initialization of variables for each LSP, $L_1$-$L_m$, in the network. Specifically, in step 204 the available bandwidth $A_1$-$A_n$ for each traffic class $T_1$-$T_n$ in each LSP $L_1$-$L_m$ is set to the corresponding traffic classes' allocated portion of the total LSP bandwidth thereby indicating that all bandwidth within a traffic class is available for allocation to customer VPN service requests. As indicated above, each traffic class $T_1$-$T_n$ within an LSP $L_1$-$L_m$ also has a corresponding vector U[n], which indicates the amount of bandwidth the corresponding traffic class has loaned to the other "n-1" traffic classes in the LSP. Each vector U[n] is initially set to 0, as shown by step 206. As indicated by steps 208 and 202, the initialization is repeated for each LSP provisioned within the network, until the initialization is complete in step 209.

Figure 3:
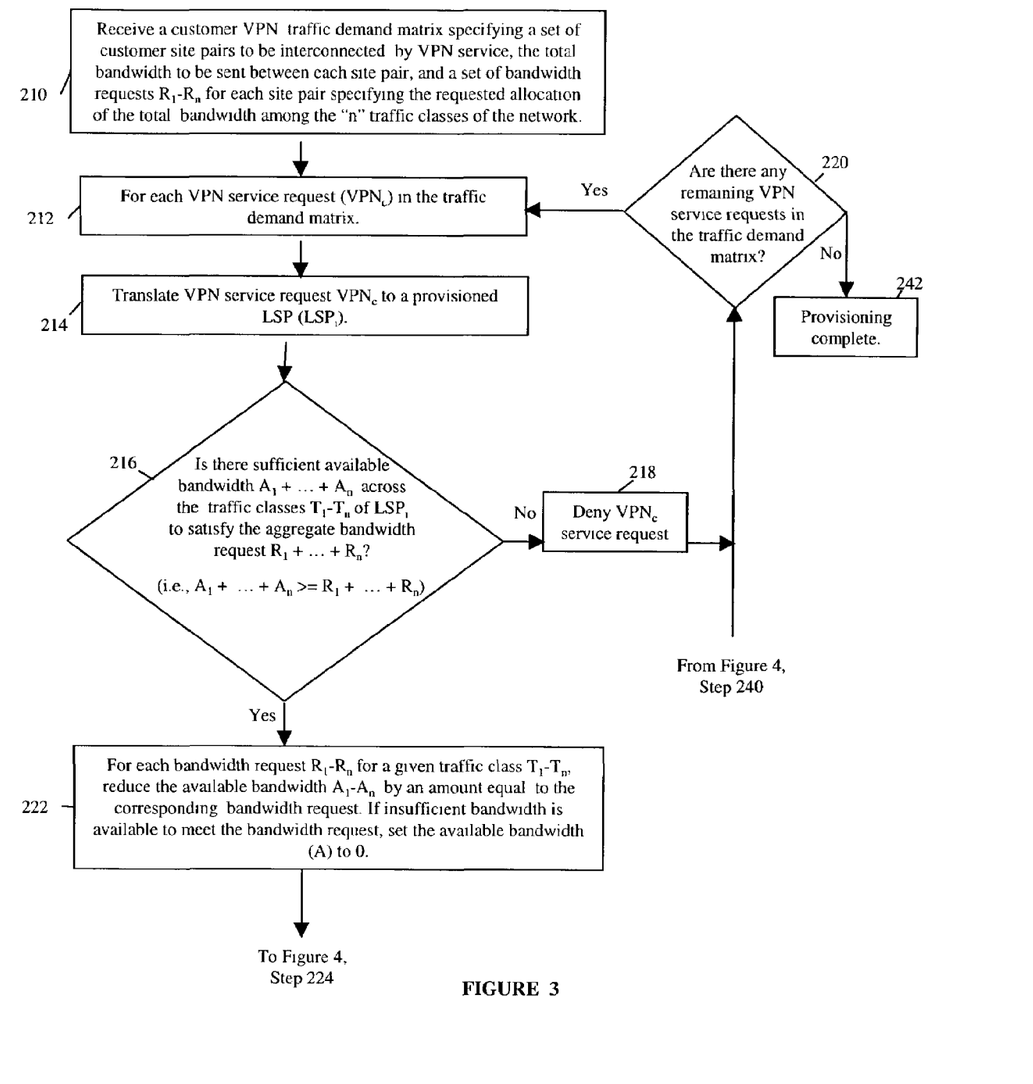
Figure 4:
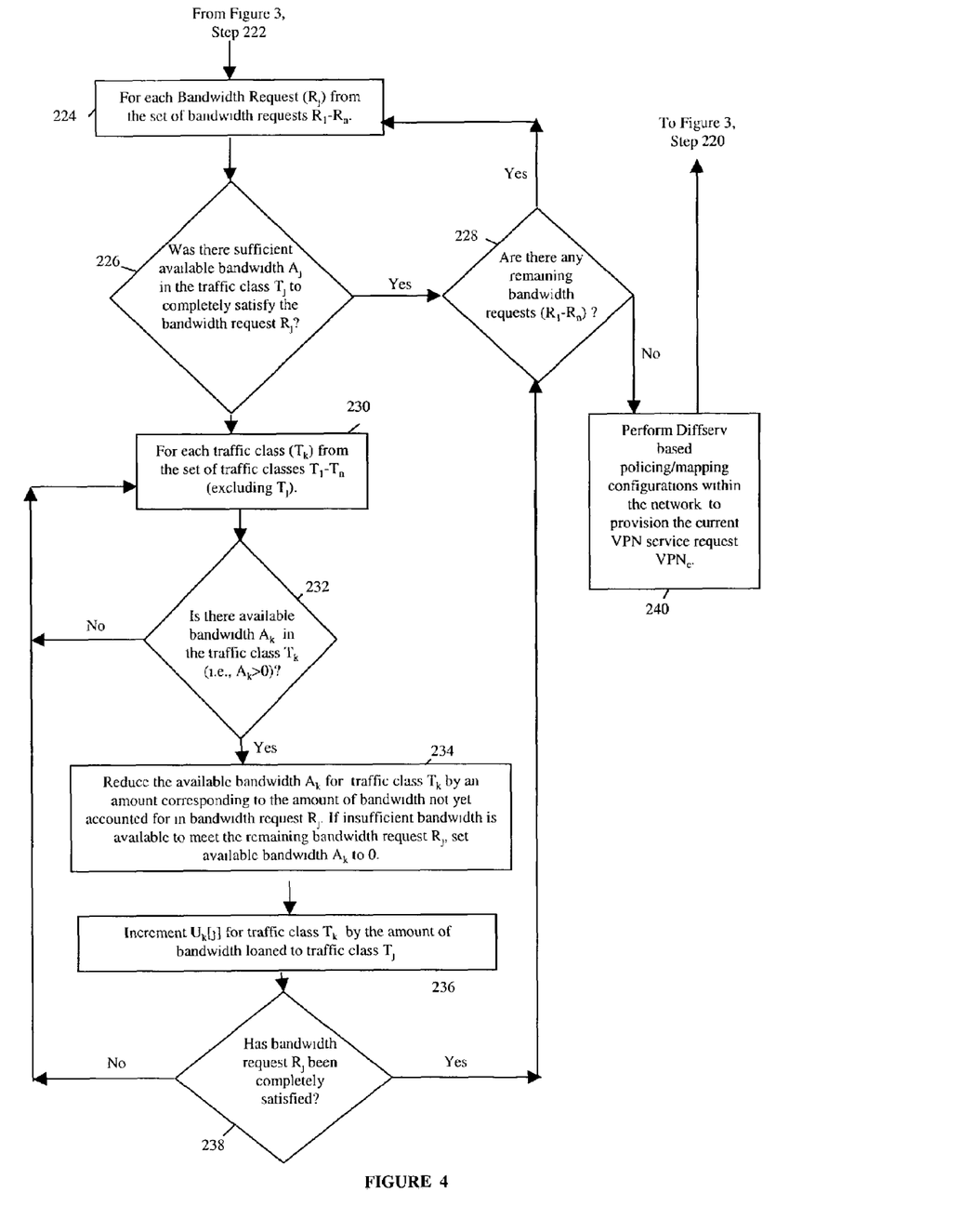

FIGS. 3 and 4 show the actual steps for dynamically reallocating bandwidth when admitting new service requests, specifically, in the context of new VPN service requests. As indicated above, customer service requests are entered to network provisioning system 102 as a VPN traffic demand matrix 114, which comprises a set of customer site pairs (130) a customer wishes to interconnect with a VPN service, the total bandwidth the customer wishes to utilize between each site pair, and a set of bandwidth requests $R_1$-$R_n$ for each site pair specifying the requested allocation of the bandwidth among the "n" traffic classes of an LSP (note that a given VPN service request may be for fewer than "n" traffic classes, "n" being used for discussion purposes). The reception of this matrix is shown in FIG. 3, step 210. The provisioning system cycles through this matrix, as shown by step 212, attempting to admit and provision each of the individual VPN service requests (each VPN service request here being designated as $VPN_c$).

Beginning with step 214 and the first VPN service request entry ($VPN_c$), the provisioning system first translates the request to a corresponding provisioned LSP (designated here as $LSP_1$) within network 120 that interconnects the pairs of remote sites as specified by the matrix 114 entry. The provisioning system next attempts to determine if there is sufficient available bandwidth $A_1$-$A_n$ in each of the traffic classes $T_1$-$T_n$ of $LSP_1$ to satisfy each of the corresponding VPN bandwidth requests $R_1$-$R_n$ of service request $VPN_c$. Specifically, at step 216, a determination is made as to whether the aggregate available bandwidth $A_1 + \ldots + A_n$ across the traffic classes $T_1$-$T_n$ of $LSP_1$ is sufficient to satisfy the aggregate bandwidth request $R_1 + \ldots + R_n$ for $VPN_c$ (i.e., whether $A_1 + \ldots + A_n \geq R_1 + \ldots + R_n$). If there is insufficient aggregate available bandwidth to satisfy the request, the VPN service request for the site pair is rejected in step 218. If there are remaining entries in the matrix, as determined by step 220, the next VPN service request, $VPN_c$, is analyzed in step 212, etc.; otherwise, the provisioning of the VPN traffic demand matrix 114 is complete (step 242).

If, however, step 216 determines there is sufficient bandwidth to satisfy the bandwidth requests $R_1$-$R_n$ of $VPN_c$, the provisioning system proceeds by determining how the bandwidth requests can be met. Specifically, in step 222, an attempt is first made to satisfy each of the bandwidth requests $R_1$-$R_n$ by using only the available bandwidth $A_1$-$A_n$ in each of the corresponding traffic classes $T_1$-$T_n$ (i.e., attempt to satisfy each request without borrowing bandwidth). In each case, if there is sufficient available bandwidth to meet the corresponding request, the available bandwidth (A) is reduced by an amount equal to the bandwidth request (R). If, however, there is insufficient available bandwidth to meet a request, the available bandwidth for the traffic class is set to 0, indicating that all bandwidth within the class has been allocated to customer traffic. In this latter case, bandwidth must be borrowed from other traffic classes to fulfill the request.

Specifically, in FIG. 4 step 224, each of the bandwidth requests (each designated here as $R_j$) from the set of bandwidth requests $R_1$-$R_n$ for service request $VPN_c$ is analyzed in turn (as indicated by step 224) to determine if there was sufficient available bandwidth $A_j$ from the corresponding traffic class $T_j$ of $LSP_1$ to completely satisfy the request (as shown by step 226). If there was sufficient bandwidth to satisfy the bandwidth request $R_j$, the next bandwidth request for $VPN_c$ is analyzed per steps 228 and 224.

However, if there was insufficient available bandwidth $A_j$ in traffic class $T_j$ to completely satisfy the bandwidth request $R_j$, each of the other n−1 traffic classes (each designated here as $T_k$) for $LSP_1$ are analyzed in turn (as indicated by step 230) to determine if each traffic class has excess available bandwidth that can be borrowed by traffic class $T_j$ in an attempt to meet the bandwidth request $R_j$. At step 232, a determination is made as to whether traffic class $T_k$ has available bandwidth $A_k$ (i.e., is $A_k > 0$). If there is no available bandwidth (i.e., $A_k = 0$), the next traffic class is analyzed per step 230. If traffic class $T_k$ has available bandwidth $A_k$, operation proceeds from step 232 to step 234 where the available bandwidth $A_k$ is reduced by an amount corresponding to the amount of bandwidth not yet accounted for in the bandwidth request $R_j$. However, if the available bandwidth $A_k$ is insufficient to meet the unaccounted for bandwidth in $R_j$, the remaining bandwidth for the traffic class $T_k$ is allocated by setting $A_k$ to 0. In either case, $U_k[j]$ for traffic class $T_k$ is then incremented in step 236 by the amount of bandwidth allocated thereby designating that traffic class $T_k$ has loaned bandwidth to traffic class $T_j$.

Operation next proceeds to step 238 where a determination is made as to whether bandwidth request $R_j$ has been completely satisfied. If bandwidth request $R_j$ has not been satisfied, operation proceeds back to step 230 where another traffic class $T_k$ is analyzed for available bandwidth $A_k$ in an attempt for traffic class $T_j$ to borrow bandwidth to satisfy the bandwidth request $R_j$. This process of traffic class $T_j$ borrowing bandwidth continues until the bandwidth request $R_j$ is completely satisfied in step 238.

Once the bandwidth request $R_j$ is completely satisfied, operation proceeds from step 238 to step 228, where a determination is made as to whether there are remaining bandwidth requests $R_j$ from the set of bandwidth requests $R_1$-$R_n$ for service request $VPN_c$ to analyze. If there are remaining bandwidth requests, operation proceeds from step 228 back to step 224 where the next bandwidth request $R_j$ is processed as above. However, if all bandwidth requests $R_1$-$R_n$ for $VPN_c$ have had bandwidth allocated, either directly from a traffic class or indirectly from another traffic class through bandwidth borrowing, operation proceeds from step 228 to step 240, where $VPN_c$ is provisioned. In particular, Diffserv configuration interface 112 communicates with edge routers 122 to perform policing/marking configurations per $VPN_c$. Once $VPN_c$ is provisioned, operation proceeds from FIG. 4, step 240 to FIG. 3, steps 220 and 212 where the next VPN service request in the VPN traffic demand matrix 114 is provisioned. Once all VPN service requests in matrix 114 are provisioned (or denied), operation proceeds from step 220 to step 242 where the admission and provisioning are complete.

Importantly, in accordance with our invention, traffic can be borrowed from more than one traffic class. As important and as indicated above, our inventive dynamic bandwidth reallocation scheme does not track bandwidth allocation and bandwidth borrowing at the bandwidth request level. The inventive method only tracks the gross allocation and borrowing of bandwidth within an LSP.

Figure 5:
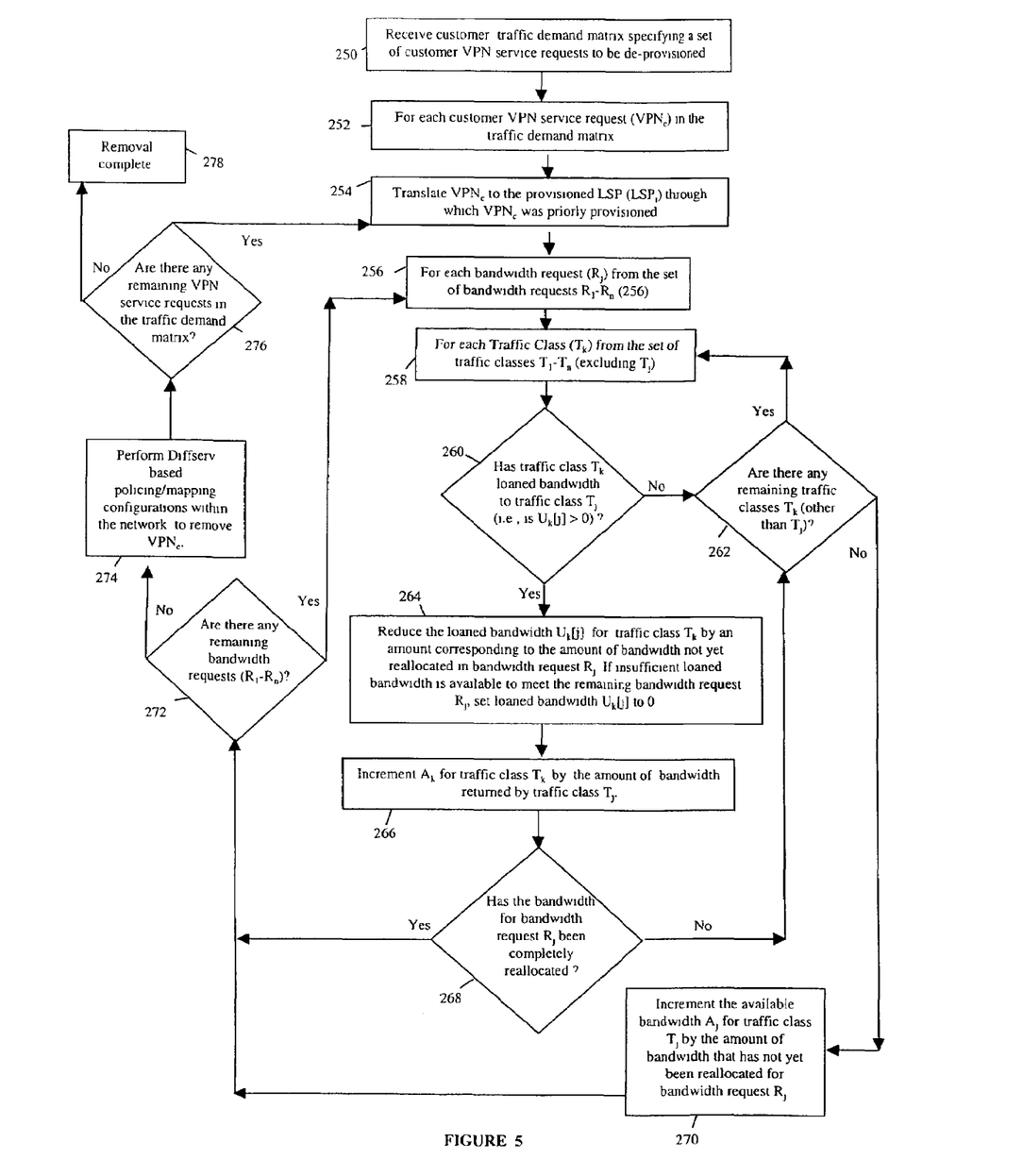
FIG. 5 depicts, in accordance with the illustrative embodiment of our invention as depicted in FIGS. 2, 3, and 4, the reallocation of network bandwidth between traffic classes when a customer service request is removed from the network.

Reference will now be made to the removal of a service request from a network path and in particular, the corresponding effect this removal has on the reallocation of bandwidth among the traffic classes of the path. The reallocation scheme is shown in FIG. 5 and is in accordance with the first embodiment as described above. Beginning with step 250, a VPN traffic demand matrix specifying a set of customer VPN service requests to be removed from network 120 is provided to processor 110/admission algorithm 108. Similar to VPN provisioning, the provisioning system 102 cycles through the matrix, as shown by step 252, removing each of the individual VPN service requests from the network (each VPN here being designated as $VPN_c$).

At step 254, the first provisioned VPN service request entry ($VPN_c$) in matrix 114 is translated to the corresponding LSP (designated here as $LSP_i$) that was used to provision $VPN_c$. Next, each of the bandwidth requests (each designated here as $R_j$) from the set of bandwidth requests $R_1$-$R_n$ for $VPN_c$ is analyzed in turn, as shown by step 256, in order to reallocate bandwidth to the traffic classes $T_1$-$T_n$ of $LSP_1$. As indicated earlier, our inventive method does not require the provisioning system to maintain how $LSP_i$'s bandwidth was originally allocated to the bandwidth requests $R_1$-$R_n$ of $VPN_c$. As such and as further described below, the bandwidth request $R_j$ is first reallocated by returning any bandwidth traffic class $T_j$ may have borrowed from the other n-1 traffic classes of $LSP_1$, regardless of how the $R_j$ bandwidth was originally allocated. If the bandwidth borrowed by $T_j$ from the other n−1 traffic classes is less than the bandwidth request $R_j$, then the remainder of the $R_j$ bandwidth is reallocated to $T_j$. However, while we describe the order of bandwidth reallocation in the above order, the exact order is not important to our invention. Hence, bandwidth can first be reallocated to traffic class $T_j$ and then reallocated to the loaning traffic classes, or any combination there of. What is important to our invention is that it is not necessary to track how the $LSP_1$ bandwidth is actually allocated to $VPN_c$. Note that this ability to not have to track LSP bandwidth allocation also makes it possible to partially remove $VPN_c$ (by de-provisioning less bandwidth than was originally provisioned) and to alter $VPN_c$ (by reducing the requested bandwidth for some traffic classes and/or increasing the requested bandwidth for others). The partial remove and altering of $VPN_c$ is similar to the total removal of $VPN_c$.

Beginning with step 258, each of the traffic classes (each designated here as $T_k$) other than $T_j$ is analyzed in turn to determine whether each traffic class $T_k$ has loaned bandwidth to traffic class $T_j$ as indicated by vector $U_k[j]$ (i.e., is $U_k[j]>0$) and as shown by step 260. If traffic class $T_k$ has not loaned bandwidth to traffic class $T_k$, the next traffic class is analyzed per steps 262 and 258, respectively.

However, if traffic class $T_k$ has loaned bandwidth to traffic class $T_j$, operation proceeds from step 260 to step 264. Here, $U_k[j]$, which indicates the bandwidth loaned by traffic class $T_k$ to $T_j$, is reduced by an amount corresponding to the amount of bandwidth not yet reallocated in bandwidth request $R_j$. If the loaned bandwidth $U_k[j]$ is insufficient to meet the remaining bandwidth of request $R_j$, $U_k[j]$ is set to 0. $A_k$ for traffic class $T_k$ is then incremented in step 266 by the amount of bandwidth $T_j$ returned to $T_k$, thereby designating that traffic class $T_k$ has available bandwidth for future VPN service requests and thereby reallocating the $R_j$ bandwidth. Operation next proceeds to step 268 where a determination is made as to whether the bandwidth of $R_j$ has been completely reallocated. If the $R_j$ bandwidth has not been completely reallocated, the remaining bandwidth reallocation will either come from other traffic classes that have loaned bandwidth to $T_j$ and/or from traffic class $T_j$ itself. Specifically, if the $R_j$ bandwidth has not been completely reallocated, operation proceeds from step 268 to step 262 where a determination is made as to whether all the traffic classes $T_k$ have been analyzed to determine if these classes have loaned bandwidth to traffic class $T_j$. If remaining classes exists, operation proceeds to step 258 where the next traffic class is analyzed, as described above However, if all traffic classes have been analyzed to determine if they have loaned bandwidth to $T_j$ and the bandwidth of request $R_j$ has not been completely reallocated, operation proceeds from step 262 to step 270 where the available bandwidth $A_j$ for traffic class $T_j$ is incremented by the amount of bandwidth that has not yet been reallocated for bandwidth request $R_j$.

Once the bandwidth of bandwidth request $R_j$ has been reallocated either to loaning traffic classes and/or to traffic class $T_j$, operation proceeds from step 268 or step 270 to step 272 where a determination is made as to whether there are remaining $VPN_c$ bandwidth requests $R_1$-$R_n$ to reallocate. If remaining requests exist, operation proceeds from step 272 back to step 256 for the reallocation of the next request as above. Once all bandwidth requests for $VPN_c$ have been reallocated, operation proceeds from step 272 to step 274 where policing/marking configurations are appropriately adjusted on edge routers 122 per Diffserv configuration interface 112. Once the $VPN_c$ service request is removed from $LSP_1$, operation proceeds from step 274 to steps 276 and 254 where the next service request ($VPN_c$), as specified by the VPN traffic demand matrix 114, is removed from a network path. Once all service requests have been removed from the network paths, operation proceeds from step 276 to step 278 where the de-provisioning is complete.

In a second embodiment of our inventive method for dynamically reallocating network bandwidth between the traffic classes of a network path, the traffic classes within the path are viewed in a hierarchical fashion such that a traffic class is allowed to borrow bandwidth from traffic classes that lie below it in the hierarchy. The implementation of this method (both provisioning and removal) is similar to the first embodiment. Such a method is useful, for example, if an ISP charges different rates for each traffic class. Note also that both the first embodiment as described above and this second embodiment can be combined, with the provisioning system 102 enforcing each method on different paths within the network.

In a third embodiment of our inventive bandwidth reallocation method, one or more traffic classes within a path adhere to static admission control as described for prior systems, while the other traffic classes within the path adhere to dynamic bandwidth reallocation through the borrowing of bandwidth. Specifically, one or more traffic classes within a network path remain independent of the other traffic classes and neither borrow nor loan bandwidth with these other traffic classes. The remaining traffic classes continue to perform dynamic bandwidth reallocation by borrowing bandwidth between the classes in accordance with our invention. Specifically, the borrowing can occur in accordance to the first embodiment, where any traffic class can borrow from any other traffic class, and/or in accordance with the second embodiment where only higher-level traffic classes can borrow from lower level traffic classes.

The above-described embodiments of our invention are intended to be illustrative only. Numerous other embodiments may be devised by those skilled in the art without departing from the spirit and scope of our invention.

ACRONYMS

Diffserv: Differentiated Services
DRR: Dynamic Round Robin
IP: Internet Protocol
ISP: Internet Service Provider
LSP: Label Switched Path
MPLS: Multi-protocol Label Switching
VPN: Virtual Private Network
WFQ: Weighted Fair Queuing

We claim:

1. A method for the reallocation of bandwidth between different traffic classes that comprise a path in a packet network in order to admit a service request for the bandwidth of one or more of said traffic classes, said method comprising the steps of:
   storing for each traffic class an available bandwidth indicator that indicates the amount of bandwidth available within that traffic class;
   determining if the available bandwidth for a specific traffic class is sufficient to meet the bandwidth requested for said specific traffic class;
   if the available bandwidth for said specific traffic class is insufficient to meet the corresponding requested bandwidth, determining if there is excess available bandwidth in one or more other traffic classes sufficient to meet the insufficiency;
   if there is sufficient excess available bandwidth in one or more other traffic classes to meet the insufficiency, reallocating bandwidth from these one or more other traffic classes to said specific traffic class in an amount equal to the insufficiency by decrementing the available bandwidth indicator for the one or more other traffic classes in the amount reallocated from these traffic classes; and admitting the new service request to the network.

2. The method of claim 1 wherein the reallocating occurs without reconfiguring the network.

3. The method of claim 1 wherein the traffic classes are organized in a higher to lower hierarchical order and wherein bandwidth reallocation occurs from lower order traffic classes to higher order traffic classes.

4. The method of claim 1 wherein the bandwidth of one or more traffic classes is static and cannot be increased or decreased through bandwidth reallocation.

5. The method of claim 1 wherein the packet network comprises a plurality of internal and edge routers configured to perform multi-protocol label switching, wherein the edge routers are further configured to perform differentiated services (Diffserv), wherein the path is a label switched path, and wherein said admitting step comprises the step of performing Diffserv based policing and marking configurations on the edge routers.

6. The method of claim 1 wherein the packet network comprises a plurality of routers configured with weighted fair queuing or dynamic round robin in order to provide the traffic classes.

7. A method for the reallocation of bandwidth between different traffic classes that comprise a path in a packet network in order to admit a service request for the bandwidth of one or more of said traffic classes, said method comprising the steps of:

storing for each traffic class an available bandwidth indicator that indicates the amount of bandwidth available within that traffic class;

determining if the available bandwidth for a specific traffic class is sufficient to meet the bandwidth requested for said specific traffic class;

if said specific traffic class has sufficient bandwidth to meet the corresponding bandwidth request, decrementing said specific traffic class' available bandwidth indicator by the amount of the bandwidth request;

if said specific traffic class has insufficient bandwidth to meet the corresponding bandwidth request, decrementing said specific traffic class' available bandwidth indicator to zero;

if the available bandwidth for said specific traffic class is insufficient to meet the corresponding requested bandwidth, determining if there is excess available bandwidth in one or more other traffic classes sufficient to meet the insufficiency;

if there is sufficient excess available bandwidth in one or more other traffic classes to meet the insufficiency, reallocating bandwidth from these one or more other traffic classes to said specific traffic class in an amount equal to the insufficiency by decrementing the available bandwidth indicator for the one or more other traffic classes in the amount reallocated from these traffic classes; and admitting the new service request to the network.

8. The method of claim 7 further comprising the step of:

storing for each traffic class a plurality of bandwidth loan indicators wherein each loan indicator for a given traffic class specifies the amount of bandwidth reallocated from said given traffic class to another traffic class within the path; and wherein said reallocating bandwidth step further comprises the step of incrementing the bandwidth loan indicator for the one or more other traffic classes in the amount reallocated from these traffic classes.

9. The method of claim 8 wherein the decrement in the available bandwidth indicators and the increment in the bandwidth loan indicators are not associated with the service request.

10. A system for reallocating bandwidth between different traffic classes that comprise a path in a packet network in order to admit a service request for the bandwidth of one or more of said traffic classes, said system comprising:

a database for storing an available bandwidth indicator for each traffic class;

means for determining if the available bandwidth for any traffic class, as specified by the corresponding available bandwidth indicator, is deficient in that there is not sufficient bandwidth in said any traffic class to meet the bandwidth requested for said any traffic class;

means for determining if there is excess available bandwidth in one or more other traffic classes sufficient to meet any bandwidth deficiencies;

means for reallocating bandwidth, sufficient to meet any bandwidth deficiencies, from said one or more other traffic classes with excess available bandwidth to traffic classes with deficient bandwidth, said means for reallocating comprising means for decrementing the available bandwidth indicators for the traffic classes with excess available bandwidth in an amount equal to the bandwidth deficiencies; and a configuration interface comprising means for configuring the network for the new service request.

11. The system of claim 10 wherein the system organizes the traffic classes in a higher to lower hierarchical order and wherein the system reallocates bandwidth from lower order traffic classes to higher order traffic classes.

12. The system of claim 10 wherein the system statically maintains the bandwidth of one or more traffic classes and does not increment or decrement through reallocation the bandwidth of said on or more traffic classes whose bandwidth is statically maintained.

13. The system of claim 10 wherein the packet network comprises a plurality of internal and edge routers configured to perform multi-protocol label switching, wherein the edge routers are further configured to perform differentiated services (Diffserv), wherein the path is a label switched path, and wherein said configuration interface further comprises means for performing Diffserv based policing and marking configurations on the edge routers.

14. A system for reallocating bandwidth between different traffic classes that comprise a path in a packet network in order to admit a service request for the bandwidth of one or more of said traffic classes, said system comprising:

a database for storing an available bandwidth indicator for each traffic class;

means for determining if the available bandwidth for any traffic class, as specified by the corresponding available bandwidth indicator, is deficient in that there is not sufficient bandwidth in said any traffic class to meet the bandwidth requested for said any traffic class;

means for determining if there is excess available bandwidth in one or more other traffic classes sufficient to meet any bandwidth deficiencies;

means for reallocating bandwidth, sufficient to meet any bandwidth deficiencies, from said one or more other traffic classes with excess available bandwidth to traffic classes with deficient bandwidth, said means for reallocating comprising means for decrementing the available bandwidth indicators far the traffic classes with excess available bandwidth in an amount equal to the bandwidth deficiencies;

means for decrementing a traffic class' available bandwidth indicator by the amount of the bandwidth requested for that traffic class when the traffic class has sufficient bandwidth to meet the bandwidth requested, and for decrementing a traffic class' available bandwidth indicator to zero when the traffic class has insufficient bandwidth to meet the bandwidth requested; and a configuration interface comprising means for configuring the network for the new service request.

15. The system of claim 14 wherein the database further stores for each traffic class a plurality of bandwidth loan indicators wherein each loan indicator for a given traffic class specifies the amount of bandwidth reallocated from the traffic class to another traffic class within the path, and wherein the means for reallocating bandwidth further comprises means for incrementing the loan indicators for the traffic classes with excess available bandwidth in an amount equal to the bandwidth deficiencies.

16. The system of claim 15 wherein an admitted service request may be removed from the network, said system further comprising:

means for determining, upon removing the admitted service request from the network, each traffic class that has had bandwidth reallocated to another traffic class to which bandwidth is being returned as a result of removing the service request from the network;

means for returning bandwidth to one or more of the determined traffic classes that have had bandwidth reallocated to another traffic class, said means comprising:

means for decrementing the bandwidth loan indicators for the one or more determined traffic classes by an amount up to but not exceeding the amount of bandwidth being returned by the service request; and means for incrementing the available bandwidth indicators for the one or more determined traffic classes in an amount equal to the amount the corresponding loan indicators were decremented; and wherein the configuration interface further comprises means for removing the service request from the network.

17. A method for reallocating bandwidth between a plurality of traffic classes that comprise a label switched path (LSP) within a multi-protocol label switching and differentiated services based network, wherein the reallocation occurs in response to receiving a bandwidth request for one or more traffic classes of the LSP, said method comprising the steps of:

determining whether a requested traffic class has sufficient available bandwidth to support the bandwidth request for that traffic class by examining an available bandwidth indicator for that traffic class;

if a requested traffic class has insufficient bandwidth to support the bandwidth request for that traffic class, determining whether one or more other traffic classes can loan the insufficient bandwidth to the requested traffic class, said determination being made by examining the available bandwidth indicators for the one or more other traffic classes;

if the one or more other traffic classes have insufficient bandwidth to loan to the requested traffic class, denying the bandwidth request; and if the one or more other traffic classes have sufficient bandwidth to loan to the requested traffic class, decrementing the available bandwidth indicators for the one or more other traffic classes in the amount of the insufficiency and admitting the request.

18. The method of claim 17 further comprising the steps of:

if a requested traffic class has sufficient available bandwidth to support the bandwidth request for that traffic class, decrementing the available bandwidth indicator for that traffic class by an amount equal to the bandwidth request; and if a requested traffic class has insufficient bandwidth to support the bandwidth requested for that traffic class, decrementing the requested traffic class' available bandwidth indicator to zero.

19. A method for reallocating bandwidth between a plurality of traffic classes that comprise a label switched path (LSP) within a multi-protocol label switching and differentiated services based network, wherein the reallocation occurs in response to receiving a bandwidth request for one or more traffic classes of the LSP, said method comprising the steps of:

determining whether a requested traffic class has sufficient available bandwidth to support the bandwidth request for that traffic class by examining an available bandwidth indicator for that traffic class;

if a requested traffic class has insufficient bandwidth to support the bandwidth request for that traffic class, determining whether one or more other traffic classes can loan the insufficient bandwidth to the requested traffic class, said determination being made by examining the available bandwidth indicators for the one or more other traffic classes;

if the one or more other traffic classes have insufficient bandwidth to loan to the requested traffic class, denying the bandwidth request;

if the one or more other traffic classes have sufficient bandwidth to loan to the requested traffic class, decrementing the available bandwidth indicators for the one or more other traffic classes in the amount of the insufficiency and admitting the request; and incrementing a bandwidth loan indicator for each of the one or more other traffic classes in the amount of the insufficiency.

* * * * *